United States Patent
Xiong et al.

(10) Patent No.: US 12,095,121 B2
(45) Date of Patent: Sep. 17, 2024

(54) ENERGY-STORAGE DEVICE AND ELECTRICITY-CONSUMPTION DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Yongfeng Xiong, Guangdong (CN); Jinqiang Chen, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/392,979

(22) Filed: Dec. 21, 2023

(65) Prior Publication Data
US 2024/0275006 A1 Aug. 15, 2024

(30) Foreign Application Priority Data
Feb. 9, 2023 (CN) .......................... 202310091036.4

(51) Int. Cl.
*H01M 50/70* (2021.01)
*H01G 11/26* (2013.01)
(Continued)

(52) U.S. Cl.
CPC ............ *H01M 50/70* (2021.01); *H01G 11/26* (2013.01); *H01G 11/78* (2013.01);
(Continued)

(58) Field of Classification Search
CPC .... H01M 50/70; H01M 50/103; H01M 50/15; H01M 50/16; H01G 11/26; H01G 11/78
See application file for complete search history.

(56) References Cited

U.S. PATENT DOCUMENTS

| 2003/0044675 A1 | 3/2003 | Packard |
| 2014/0162095 A1 | 6/2014 | Coad |
| 2015/0357624 A1 | 12/2015 | Yamafuku et al. |

FOREIGN PATENT DOCUMENTS

| CN | 205488291 U | 8/2016 |
| CN | 205790086 U | 12/2016 |

(Continued)

OTHER PUBLICATIONS

English translation of CN208580773U (Year: 2019).*
(Continued)

*Primary Examiner* — Ula C Ruddock
*Assistant Examiner* — Sarika Gupta
(74) *Attorney, Agent, or Firm* — IP Spring

(57) ABSTRACT

The present disclosure provides an energy-storage device and an electricity-consumption device. The energy-storage device includes a housing, an electrode assembly, an end cap assembly, and a lower plastic assembly. The housing has an opening and is provided with an accommodating cavity in communication with the opening, and the accommodating cavity is configured to store fluid. The lower plastic assembly includes a cover plate and two distribution members connected to the cover plate. Each distribution member is provided with a reflux tank, and the reflux tank is configured to collect fluid flowing out from the accommodating cavity and distribute fluid into the accommodating cavity. Each reflux tank defines a first distribution channel and a second distribution channel in a length direction of the lower plastic assembly. Fluid flow capacity of the first distribution channel is greater than fluid flow capacity of the second distribution channel.

19 Claims, 7 Drawing Sheets

(51) Int. Cl.
*H01G 11/78* (2013.01)
*H01M 50/103* (2021.01)
*H01M 50/15* (2021.01)
*H01M 50/16* (2021.01)

(52) U.S. Cl.
CPC ......... *H01M 50/103* (2021.01); *H01M 50/15* (2021.01); *H01M 50/16* (2021.01)

(56) References Cited

FOREIGN PATENT DOCUMENTS

| CN | 208580773 | U | * | 3/2019 |
|---|---|---|---|---|
| CN | 212392313 | U | | 1/2021 |
| CN | 212874611 | U | | 4/2021 |
| CN | 215869718 | U | | 2/2022 |
| CN | 216354469 | U | | 4/2022 |
| CN | 217134507 | U | | 8/2022 |
| CN | 217848003 | U | | 11/2022 |
| CN | 115528378 | A | | 12/2022 |
| CN | 115579597 | A | | 1/2023 |
| CN | 218414978 | U | | 1/2023 |
| JP | 2014096269 | A | | 5/2014 |

OTHER PUBLICATIONS

WIPO, International Search Report and Written Opinion for International Patent Application No. PCT/CN2023/075257, Jun. 23, 2023, 15 pages.

CNIPA, First Office Action for corresponding Chinese Patent Application No. 202310091036.4, Apr. 28, 2023, 12 pages.

CNIPA, Notice of Allowance for corresponding Chinese Patent Application No. 202310091036.4, May 15, 2023, 8 pages.

* cited by examiner

ENERGY-STORAGE DEVICE AND ELECTRICITY-CONSUMPTION DEVICE

CROSS-REFERENCE TO RELATED APPLICATIONS

This application claims priority under 35 U.S.C. § 119(a) to Chinese Patent Application No. 202310091036.4, filed Feb. 9, 2023, the entire disclosure of which is incorporated herein by reference.

TECHNICAL FIELD

The present disclosure relates to the technical field of energy storage, and in particular, to an energy-storage device and an electricity-consumption device.

BACKGROUND

With increasingly prominent environmental problems, the low-carbon economy has become the mainstream of future economic development. The increasingly severe air emissions situation has further promoted the rise and development of energy-storage devices. Energy-storage devices with a high energy density, a high power density, a large number of cycles, and a long storage time has become the key to solving global problems such as the energy crisis and environmental pollution.

Energy-storage devices may include a housing and an electrode assembly arranged in the housing. An electrolyte is accommodated in the housing, and the electrode assembly is immersed in the electrolyte. An electrochemical reaction can occur between the electrode assembly and the electrolyte to covert chemical energy into electrical energy, so that the energy-storage device can output electric energy. However, when the energy-storage device is charged and discharged cyclically or stored for a long time, the electrolyte in the housing may gradually decompose and produce gas. Uneven electrolyte distribution may occur in the energy-storage device after long-term use of the energy-storage device.

SUMMARY

An embodiment of the present disclosure provides an energy-storage device and an electricity-consumption device.

According to a first aspect, the present disclosure provides an energy-storage device. The energy-storage device includes a housing, an electrode assembly, an end cap assembly, and a lower plastic assembly. The housing has an opening. The housing is provided with an accommodating cavity in communication with the opening. The accommodating cavity is configured to store fluid. The electrode assembly is accommodated in the accommodating cavity and configured as a wound electrode assembly. The end cap assembly covers the opening. The lower plastic assembly includes a cover plate and two distribution members. The cover plate is mounted to the end cap assembly, and the two distribution members are arranged in a width direction of the lower plastic assembly and connected to the cover plate. Each of the distribution members is provided with a reflux tank in communication with the accommodating cavity, and the reflux tank is configured to collect fluid flowing out from the accommodating cavity and distribute the fluid into the accommodating cavity to immerse the electrode assembly. Each reflux tank defines a first distribution channel and a second distribution channel in a length direction of the lower plastic assembly, the first distribution channel is located between the second distribution channel and a central axis of the lower plastic assembly, and fluid flow capacity of the first distribution channel is greater than fluid flow capacity of the second distribution channel. In the length direction of the lower plastic assembly, the first distribution channel corresponds to a middle portion of the electrode assembly, and the second distribution channel corresponds to a side portion of the electrode assembly.

According to a second aspect, the present disclosure provides an electricity-consumption device. The electricity-consumption device includes the energy-storage device in the first aspect, and the energy-storage device is configured to provide electric energy for the electricity-consumption device.

BRIEF DESCRIPTION OF THE DRAWINGS

In order to describe the technical solutions of embodiments of the present disclosure more clearly, the accompanying drawings for the embodiments are briefly described below: The accompanying drawings in the following description show only some embodiments of the present disclosure, and a person of ordinary skill in the art may derive other accompanying drawings from these accompanying drawings.

Figure 1:
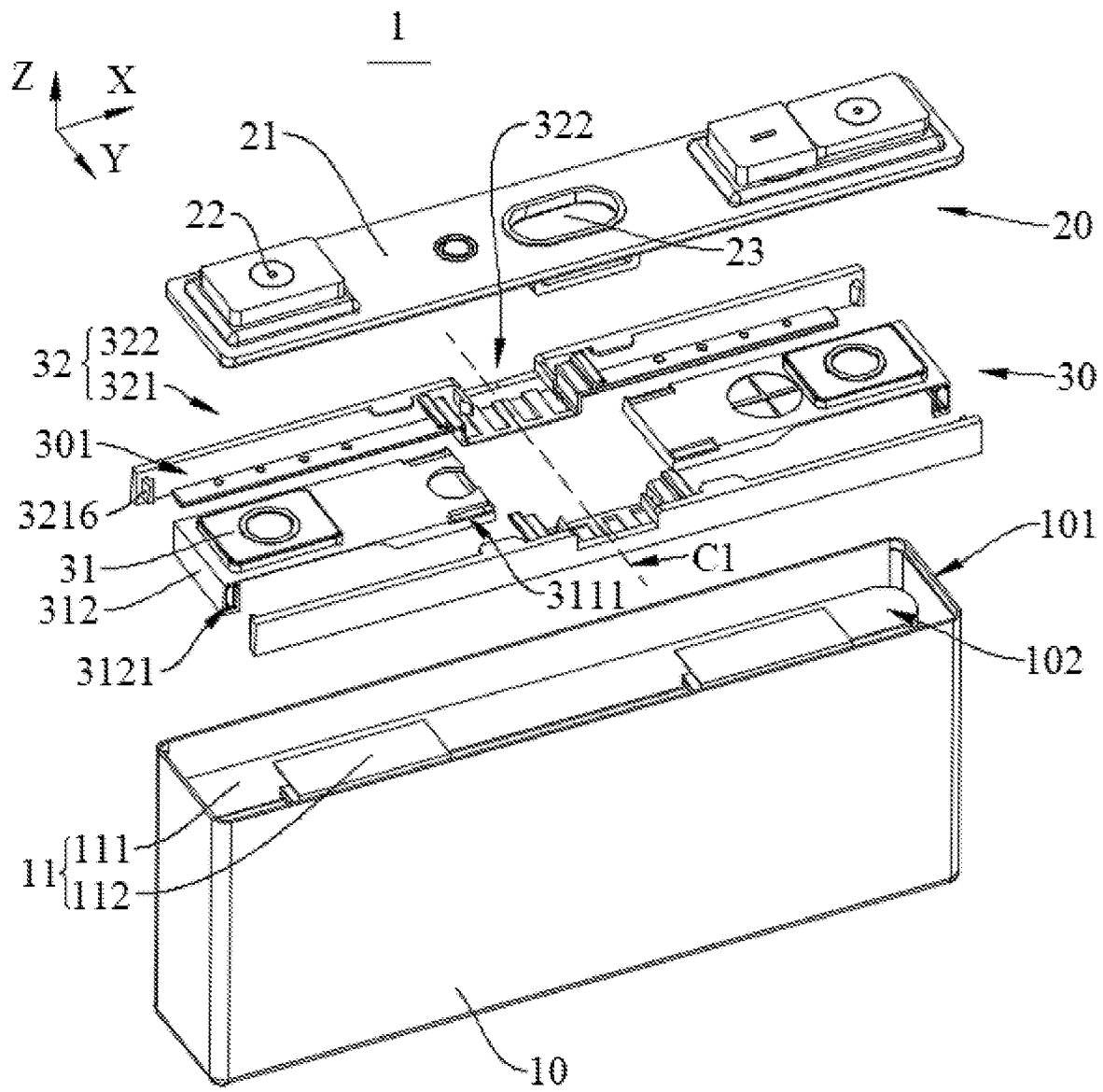
FIG. 1 is an exploded view of an energy-storage device according to a first embodiment of the present disclosure.

Main reference numerals are as follows.

Energy-storage device 1: Housing 10; Opening 101; Accommodating cavity 102: Electrode assembly 11; Cell body 111; Tab 112: End cap assembly 20: Top cover plate 21; Terminal post 22; Explosion-proof valve 23: Lower plastic assembly 30; Central axis C1; Cover plate 31: Engagement slot 3111: Engagement plate 312: Engagement hole 3121; Distribution body 32; Distribution body 32*a*: Distribution body 32*b*; Distribution body 32*c*: Distribution body 32*d*: Distribution body 32*e*; Distribution body 32*f*; Distribution member 321: Reflux tank 301: First distribution channel 302: First through hole 3021: Second distribution channel 303: Second through hole 3031: Auxiliary distribution channel 304: Connection opening 305: First plate 3211: Second plate 3212; First edge portion 3213; Second edge portion 3214: Engagement block 3215; Engagement plug 3216; Block 3217; Connection member 322; First spacing S1: Second spacing S2: Third spacing S3; First distance D1: Second distance D2; Third distance L1: Fourth distance L2: Distance L3: Fifth distance M1: Sixth distance M2; Seventh distance M3: First dashed line N1: Second dashed line N2: Third dashed line N3: Fourth dashed line N4; and Fifth dashed line N5.

The following specific implementations are to be combined with the foregoing accompanying drawings to further describe various embodiments.

DETAILED DESCRIPTION

The technical solutions in embodiments of the present disclosure are clearly described below with reference to the accompanying drawings for the embodiments of the present disclosure. The described embodiments are merely some rather than all of the embodiments of the present disclosure. Other embodiments obtained by a person of ordinary skill in the art based on the embodiments of the present disclosure shall fall within the protection scope of the present disclosure.

Embodiments or implementations mentioned in this specification mean that particular features, structures, or characteristics described with reference to the embodiments or implementations may be included in at least one embodiment of the present disclosure. A term appearing at different positions of this specification may not refer to the same embodiment or an independent or alternative embodiment that is mutually exclusive with other embodiments. A person skilled in the art can explicitly or implicitly understand that the embodiments described in this specification may be combined with other embodiments.

It is to be noted that the terms in the description and claims of the present disclosure and the above accompanying drawings are only for describing specific embodiments, and are not intended to limit the present disclosure. The terms "first", "second" and the like in the description and claims of the present disclosure and the accompanying drawings are used for distinguishing different objects, rather than being used for describing a specific order. The term "and/or" used in the description of the present disclosure and the appended claims means any combination and all possible combinations of one or more of associated listed items, and includes these combinations.

An energy-storage device in the present disclosure may include but is not limited to at least one of a power cell, a fuel cell, a super-capacitor, a cell, a battery module, a battery pack, a battery system, or the like. The power cell may include, but is not limited to, a lithium ion power cell, a nickel-metal hydride power cell, a super-capacitor, and the like. When the energy-storage device is a cell, the energy-storage device may be a prismatic cell.

It may be understood that, in order to make a person skilled in the art better understand the energy-storage device, the energy-storage device is described in detail with reference to FIG. 1 by using a prismatic power cell as an example. It is to be noted that the energy-storage device is a prismatic power cell for illustration only, which is not specifically limited in the present disclosure. For example, a product type of the energy-storage device may also be set according to actual needs.

The energy-storage device includes a housing and an electrode assembly arranged in the housing. Electrolyte is accommodated in the housing, and the electrode assembly is immersed in the electrolyte. An electrochemical reaction can occur between the electrode assembly and the electrolyte to convert chemical energy into electrical energy, so that the energy-storage device can output electric energy. However, when the energy-storage device is charged and discharged cyclically or stored for a long time, the electrolyte in the housing may gradually decompose and produce gas. Uneven electrolyte distribution may occur after long-term use of the energy-storage device. In particular, electrolyte at different positions in the energy-storage device may have different decomposition rates. A decomposition rate of electrolyte in a middle region of the energy-storage device is greater than a decomposition rate of electrolyte in an edge region of the energy-storage device.

In order to resolve the above problem, the present disclosure provides an energy-storage device and an electricity-consumption device. In the present disclosure, for clearer illustration, a length direction of a lower plastic assembly is defined an X-axis direction, a width direction of the lower plastic assembly is defined as a Y-axis direction, and a height direction of the lower plastic assembly is defined as a Z-axis direction.

Figure 2:
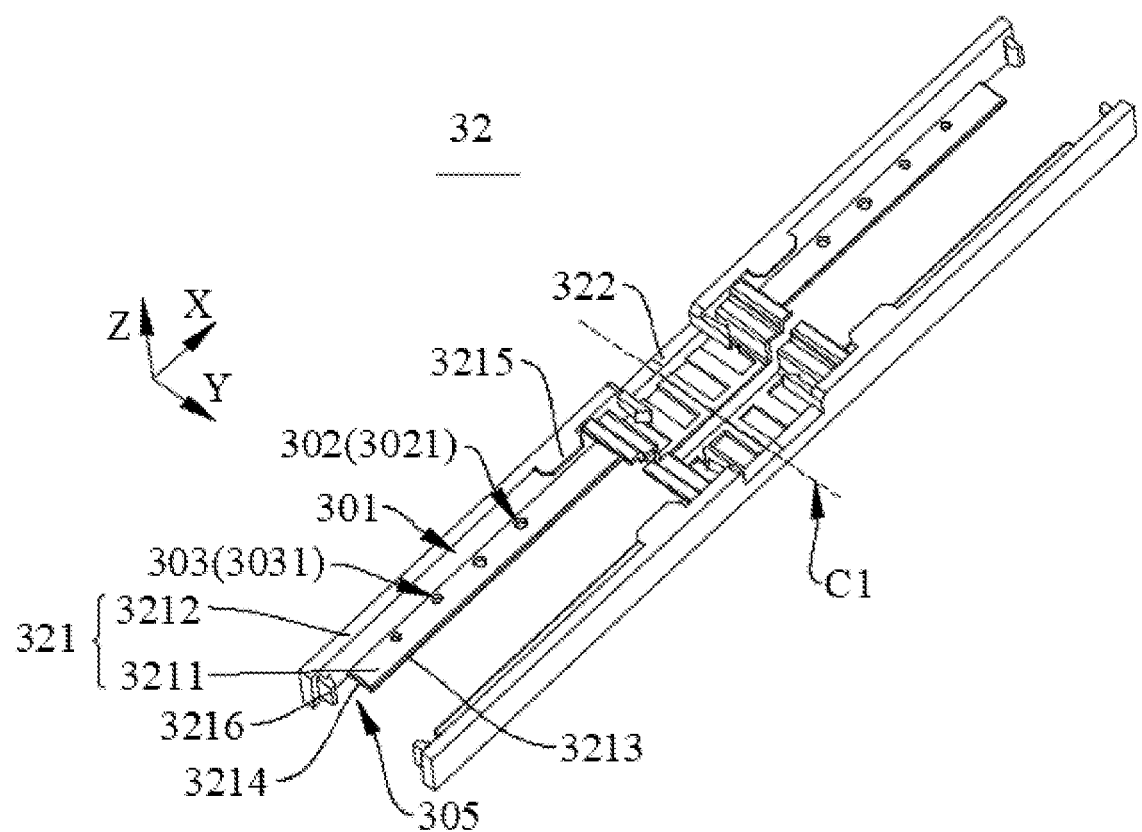
FIG. 2 is a schematic structural view of a distribution body in a lower plastic assembly according to a first embodiment of the present disclosure.

Referring to FIG. 1 and FIG. 2 together, FIG. 1 is an exploded view of an energy-storage device 1 according to a first embodiment of the present disclosure. The energy-storage device 1 includes a housing 10, an end cap assembly 20, and a lower plastic assembly 30. The housing 10 has an opening 101, and the housing 10 is provided with an accommodating cavity 102. The accommodating cavity 102 is in communication with the opening 101. The accommodating cavity 102 is configured to store fluid. The energy-storage device 1 further includes an electrode assembly 11, and the electrode assembly 11 is accommodated in the accommodating cavity 102 and immersed in the fluid in the accommodating cavity 102. The fluid includes electrolyte and gas, that is, the fluid is a mixture of the electrolyte and the gas. The end cap assembly 20 covers the opening 101 to seal the opening 101, thereby sealing the fluid and the electrode assembly 11 in the accommodating cavity 102. The lower plastic assembly 30 is located between the end cap assembly 20 and the electrode assembly 11. The lower plastic assembly 30 includes a cover plate 31 and two distribution members 321. The cover plate 31 is mounted to the end cap assembly 20, and the two distribution members 321 are arranged in a width direction of the lower plastic assembly 30 and connected to the cover plate 31. Each of the distribution members 321 is provided with a reflux tank 301 in communication with the accommodating cavity 102. The reflux tank 301 can be configured to collect fluid flowing out from the accommodating cavity 102 and distribute the fluid into the accommodating cavity 102 to immerse the electrode assembly 11.

Each reflux tank 301 defines a first distribution channel 302 and a second distribution channel 303 in a length direction of the lower plastic assembly 30. The first distribution channel 302 is located between the second distribution channel 303 and a central axis C1 of the lower plastic assembly 30, and fluid flow capacity of the first distribution channel 302 is greater than fluid flow capacity of the second distribution channel 303. The central axis C1 is parallel to the width direction of the lower plastic assembly 30 and located in a middle region of the lower plastic assembly 30 in the length direction of the lower plastic assembly 30. Specifically, the electrode assembly 11 includes two tabs 112 arranged at intervals in the length direction of the lower plastic assembly 30. The middle region of the lower plastic assembly 30 may be located at or near a midpoint of a line connecting the two tabs 112, and each edge region of the lower plastic assembly 30 may be close to one of the two tabs 112. A middle region of the energy-storage device 1 corresponds to the middle region of the lower plastic assembly 30, and an edge region of the energy-storage device 1 corresponds to the edge region of the lower plastic assembly 30. A middle region of the accommodating cavity 102 corresponds to the middle region of the lower plastic assembly 30, and an edge region of the accommodating cavity 102 corresponds to the edge region of the lower plastic assembly 30. The lower plastic assembly 30 further includes a distribution body 32. The distribution body 32 includes a connection member 322 and the two distribution members 321 respectively connected to two ends of the connection member 322. The connection member 322 is located in the middle of the lower plastic assembly 30, and the central axis C1 extends through the connection member 322. The distribution member 321 may be integrally formed with the connection member 322 or separately formed.

It is to be noted that FIG. 1 is only to schematically describe the arrangement of the housing 10, the end cap assembly 20, the electrode assembly 11, and the lower plastic assembly 30, and does not constitute a specific limitation on the connection position, connection relationship, and specific structure of each element. FIG. 1 shows a schematic structure of the energy-storage device 1 according to an embodiment of the present disclosure, and does not constitute a specific limitation on the energy-storage device 1. In other embodiments of the present disclosure, the energy-storage device 1 may include more or less components than those shown in FIG. 1, or some components in FIG. 1 may be combined or components different from those in FIG. 1 may be included. For example, the energy-storage device 1 may further include, but is not limited to, a temperature sensor, a battery management system, a connecting harness, and the like.

It can be understood that, when the energy-storage device 1 is charged and discharged cyclically or stored for a long time, the electrolyte in the energy-storage device 1 may gradually decompose and produce gas. Specifically, when an electrochemical reaction between the electrode assembly 11 and the electrolyte occurs and electric energy is generated, side reactions are often accompanied, and the side reactions are mainly generated by the electrolyte. The side reactions may lead to decomposition of the electrolyte, and are accompanied by generation of gas products. For example, electrolyte of an ethylene carbonate/dimethyl carbonate (EC/DMC) system is used as an example. During charging and discharging, for the electrolyte of the ethylene carbonate/dimethyl carbonate system, ring-opening may occur in ethylene carbonate solvent due to gaining of an electron, and then a molecular structure of the ethylene carbonate solvent may break due to gaining of another electron, thereby generating a lithium formate group and lithium ethoxide group. When H+ ions exist in the electrolyte, the lithium ethoxide group and H+ ions may combine to generate lithium ethoxide. The lithium ethoxide in electrolyte may react with dimethyl carbonate solvent to generate methyl ethyl carbonate (EMC) and lithium methoxide, and the methyl ethyl carbonate generated by the reaction may further react with the lithium ethoxide in the electrolyte to generate diethyl carbonate (DEC) and lithium methoxide. The diethyl carbonate in the electrolyte may decompose after gaining of two electrons to generate lithium carbonate and ethylene gas. In addition, the dimethyl carbonate in the electrolyte may decompose to generate methyl functional groups after gaining of electrons, and two methyl functional groups may combine to generate ethane gas. In this way, with the cyclic charging and discharging of the energy-storage device 1, the electrolyte in the energy-storage device 1 may gradually decompose and generate gas. The electrode assembly (a jelly roll) of the energy-storage device (such as a prismatic cell and a cylindrical cell) is generally formed by winding and has the largest tightening force and the maximum heat in the middle region of the electrode assembly after being wound, and therefore the electrode assembly reacts with more electrolyte in the middle region of the electrode assembly. However, the heat at the outer periphery of the jelly roll is not as much, and thus electrolyte consumed is naturally not as much.

Electrolyte at different positions in the energy-storage device 1 may have different decomposition rates. Specifically, a decomposition rate of electrolyte in the middle region of the energy-storage device 1 is greater than a decomposition rate of electrolyte in the edge region of the energy-storage device 1. That is to say, in the energy-storage device 1, the decomposition rate of the electrolyte close to the central axis C1 in the length direction of the lower plastic assembly 30 is greater than the decomposition rate of the electrolyte close to the edge region. Therefore, uneven electrolyte distribution may occur after the energy-storage device 1 is used for a period of time. In the present disclosure, the reflux tank 301, the first distribution channel 302, and the second distribution channel 303 are arranged, so that the electrolyte flowing out from the accommodating cavity 102 can be distributed into the accommodating cavity 102. In addition, since the fluid flow capacity of the first distribution channel 302 is greater than the fluid flow capacity of the second distribution channel 303, electrolyte flowing through the first distribution channel 302 is more than electrolyte flowing through the second distribution channel 303, so that electrolyte flowing back to the middle region of the accommodating cavity 102 is more than electrolyte flowing back to the edge region of the accommodating cavity 102, thereby achieving even electrolyte distribution in the energy-storage device 1. In addition, a faster decomposition rate of the electrolyte leads to more gas generated by the decomposition of the electrolyte. That is to say, gas generated by the electrolyte in the middle region of the accommodating cavity 102 may be more than gas generated by the electrolyte in the edge region of the accommodating cavity 102. In the present disclosure, the fluid flow capacity of the first distribution channel 302 is greater than the fluid flow capacity of the second distribution channel 303, so that gas generated by the decomposition of the electrolyte in the accommodating cavity 102 can also flow out into the reflux tank 301 synchronously, thereby avoiding gas accumulation in the middle region of the accommodating cavity 102.

It may be understood that when the energy-storage device 1 is vibrated, shaken, or turned over, the electrolyte in the accommodating cavity 102 may overflow from the accommodating cavity 102 and overflow into the reflux tank 301 in a height direction of the lower plastic assembly 30. The electrolyte overflowing into the reflux tank 301 may flow back into the accommodating cavity 102 under the influence of gravity. In the present disclosure, since electrolyte at different positions in the accommodating cavity 102 may have different decomposition rates, by adjusting electrolyte reflux-flow capacity through the first distribution channel 302 and the second distribution channel 303, electrolyte redistribution can be realized, thereby achieving even electrolyte distribution in the accommodating cavity 102.

Figure 3:
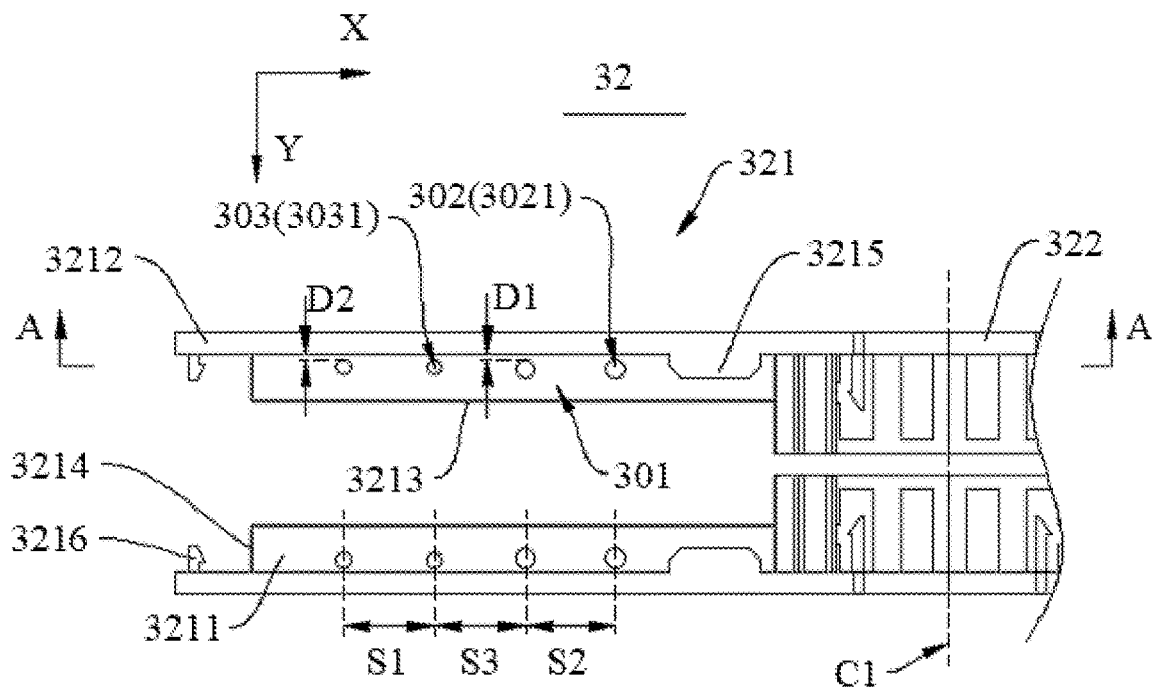
FIG. 3 is a top view of the distribution body in the lower plastic assembly according to the first embodiment of the present disclosure.

Referring to FIG. 3, the two distribution members 321 are symmetrically arranged with respect to the cover plate 31 in the width direction of the lower plastic assembly 30, so that the distribution members 321 located at different sides of the cover plate 31 can be replaced with each other during mounting of the lower plastic assembly 30, and it is not necessary to distinguish between mounting directions of the distribution members 321, thereby facilitating the mounting of the distribution members 321 and improving assembly efficiency of the distribution members 321 and the cover plate 31. In some embodiments, the two reflux tanks 301 of the two distribution members 321 are also symmetrically arranged with respect to the cover plate 31 in the width direction of the lower plastic assembly 30.

Referring to FIG. 2 and FIG. 3 together, each of the distribution members 321 includes a first plate 3211 and a second plate 3212 connected to the first plate 3211. The first plate 3211 is arranged opposite to the cover plate 31. The second plate 3212 is located between the cover plate 31 and the first plate 3211. In this embodiment, the first plate 3211 and the second plate 3212 are both configured as rectangular plates. Length directions of the first plate 3211 and the second plate 3212 are both parallel to the length direction of the lower plastic assembly 30. The first plate 3211 is connected to a side of the second plate 3212 away from the cover plate 31, and the first plate 3211 and the second plate 3212 are perpendicular to each other after the first plate 3211 and the second plate 3212 are connected. The reflux tank 301 is defined by the first plate 3211, the second plate 3212, and the cover plate 31 together, so as to accommodate the electrolyte flowing out from the accommodating cavity 102. The first plate 3211 defines the first distribution channel 302 and the second distribution channel 303 in communication with both the reflux tank 301 and the accommodating cavity 102. The distribution member 321 may further limit the electrode assembly 11, so as to keep the electrode assembly 11 fixed relative to the accommodating cavity 102, thereby avoiding great shaking of the electrode assembly 11 in the accommodating cavity 102 during transportation of the energy-storage device 1, and accordingly avoiding an abnormal electrical connection or a short circuit.

In this embodiment, the second plate 3212 is longer than the first plate 3211 in the length direction of the lower plastic assembly 30. The first plate 3211 and the second plate 3212 together form a connection opening 305 close to the edge region of the lower plastic assembly 30 in the length direction of the lower plastic assembly 30, where the connection opening 305 is in communication with both the reflux tank 301 and the accommodating cavity 102. Therefore, the electrolyte in the accommodating cavity 102 can flow out into the reflux tank 301 through the connection opening 305 when the energy-storage device 1 is shaken.

Refer to FIG. 1 and FIG. 2 again, the electrode assembly 11 includes a cell body 111 and a tab 112 connected to the cell body 111. The cell body 111 is immersed in the electrolyte in the accommodating cavity 102. For example, in this embodiment, the electrode assembly 11 includes two cell bodies 111 arranged in the width direction of the lower plastic assembly 30. It is to be noted that the number of the cell bodies 111 is only for illustration, and does not constitute a specific limitation. The number of the cell bodies 111 needs to be designed according to the actual product design. The end cap assembly 20 includes a top cap sheet 21 and a terminal post 22 extending through the top cap sheet 21. The top cap sheet 21 is connected to the housing 10 and covers the opening 101. The terminal post 22 is connected to the tab 112, so as to output electric energy. The cover plate 31 is connected to a side of the top cap sheet 21 facing the opening 101, and defines a mounting hole for the terminal post 22 to extend through. After the tab 112 is connected to the terminal post 22, the tab 112 is located between the first plates 3211 of the two distribution members 321.

The first plate 3211 includes a first edge portion 3213 and a second edge portion 3214. One end of the second edge portion 3214 is connected to the second plate 3212, and another end of the second edge portion 3214 is connected to the first edge portion 3213. The first edge portion 3213 is located at a side of the first plate 3211 away from the second plate 3212. The second edge portion 3214 is located at a side of the first plate 3211 away from the central axis C1 in the length direction of the lower plastic assembly 30. The first edge portion 3213 and/or the second edge portion 3214 is in the shape of a filleted corner. In this embodiment, the first edge portion 3213 and the second edge portion 3214 are respectively in the shape of a filleted corner, and a joint of the first edge portion 3213 and the second edge portion 3214 is in the shape of a filleted corner, so as to realize smooth arrangement and smooth connection of the first edge portion 3213 and the second edge portion 3214. It may be understood that during mounting of the energy-storage device 1, the tab 112 is prone to be in contact with or scraped by the first plate 3211. Alternatively, when the energy-storage device 1 is vibrated, the tab 112 may contact or is scraped by the first plate 3211. Since the tab 112 has a fragile sheet structure, the tab 112 is prone to scratches or cuts when subject to scrape. In this embodiment, each of the first edge portion 3213 and the second edge portion 3214 is in the shape of a filleted corner, and the joint of the first edge portion 3213 and the second edge portion 3214 is in the shape of a filleted corner, so that the first plate 3211 has no sharp corner or burr, thereby avoiding the damage of the first plate 3211 to the tab 112.

Referring to FIG. 2 and FIG. 3 together, the first distribution channel 302 and the second distribution channel 303 are respectively arranged close to the second plate 3212, so that electrolyte retention in the joint of the first plate 3211 and the second plate 3212 can be avoided, and electrolyte can quickly flow back into the accommodating cavity 102.

A distance between the first distribution channel 302 and the second plate 3212 is a first distance D1, a distance between the second distribution channel 303 and the second plate 3212 is a second distance D2, and the first distance D1 and/or the second distance D2 ranges from 0.5 mm to 3 mm. The first distance D1 may be a distance between an edge of the first distribution channel 302 close to the second plate 3212 and the second plate 3212, and the second distance D2 may be a distance between an edge of the second distribution channel 303 close to the second plate 3212 and the second plate 3212. In some embodiments, the first distance D1 and the second distance D2 may be the same. For example, the first distance D1 may be 0.5 mm, and the second distance D2 may be 0.5 mm. In some embodiments, the first distance D1 and the second distance D2 may be respectively any of 0.5 mm, 0.7 mm, 0.75 mm, 1 mm, 1.2 mm, 1.25 mm, 1.3 mm, 1.5 mm, 1.6 mm, 1.8 mm, 2 mm, 2.4 mm, 2.5 mm, 3 mm, and the like. In some embodiments, the first distance D1 and the second distance D2 may be different, for example, the first distance D1 may be 1.2 mm, and the second distance D2 may be 1.25 mm.

In this embodiment, the first distribution channel 302 is configured as a first through hole 3021 defined in the first plate 3211, and the second distribution channel 303 is configured as a second through hole 3031 defined in the first plate 3211. The fluid flow capacity of the first distribution channel 302 may be represented by a cross-sectional area of the first through hole 3021, and the fluid flow capacity of the second distribution channel 303 may be represented by a cross-sectional area of the second through hole 3031. In this embodiment, the cross-sectional area of the first through hole 3021 is larger than the cross-sectional area of the second through hole 3031. Cross-sections of the first through hole 3021 and the second through hole 3031 may be circular, rectangular, elliptical, polygonal, special-shaped, or the like. The cross-sections of the first through hole 3021 and the second through hole 3031 may be in the same shape or different shapes. For example, in this embodiment, the cross-sectional shapes of the first through hole 3021 and the second through hole 3031 may both be circular. For another example, in another embodiment, the cross-section of the first through hole 3021 may be elliptical, and the cross-section of the second through hole 3031 may be triangular.

In this embodiment, a ratio of the fluid flow capacity of the first distribution channel 302 to the fluid flow capacity of the second distribution channel 303 is greater than 1 and less than or equal to 4. In this way, during flowing back of the electrolyte in the reflux tank 301 to the accommodating cavity 102, it can be ensured that there is electrolyte in both the first distribution channel 302 and the second distribution channel 303, and further electrolyte accumulation in the reflux tank 301 due to an excessive difference between the electrolyte flow capacity of the first distribution channel 302 and the electrolyte flow capacity of the second distribution channel 303 can be avoided. The specific ratio of the fluid flow capacity of the first distribution channel 302 to the fluid flow capacity of the second distribution channel 303 may be specifically set based on factors such as the decomposition rate of the electrolyte in the energy-storage device 1, the size of the lower plastic assembly 30 in the length direction, and the spacing between the first distribution channel 302 and the second distribution channel 303, which is not specifically limited in the present disclosure. For example, when the ratio of the decomposition rate of the electrolyte in the middle region of the lower plastic assembly 30 to the decomposition rate of the electrolyte in the edge region of the lower plastic assembly 30 in the length direction of the lower plastic assembly 30 is relatively large, the ratio of the fluid flow capacity of the first distribution channel 302 to the fluid flow capacity of the second distribution channel 303 may be increased, so that more electrolyte can flow back to the middle region of the lower plastic assembly 30. In some embodiments, the ratio of the fluid flow capacity of the first distribution channel 302 to the fluid flow capacity of the second distribution channel 303 may be any of 1.07, 1.1, 1.2, 1.27, 1.29, 1.36, 1.5, 2, 2.5, 3, 3.5, 4, and the like. In some embodiments, the ratio of the cross-sectional area of the first through hole 3021 to the cross-sectional area of the second through hole 3031 may range from 1.12 to 3.24. In some embodiments, the ratio of the cross-sectional area of the first through hole 3021 to the cross-sectional area of the second through hole 3031 may be any of 1.12, 1.2, 1.3, 1.5, 2, 2.5, 3, 3.24, and the like.

In this embodiment, multiple first distribution channels 302 are arranged, and the multiple first distribution channels 302 are arranged at equal intervals. Multiple second distribution channels 303 are arranged, and the multiple second distribution channels 303 are arranged at equal intervals. In this way, during machining of the multiple first distribution channels 302 or the multiple second distribution channels 303, the same spacing may be used for machining, thereby reducing the complexity of machining, and optimizing electrolyte distribution in the first distribution channels 302 and the second distribution channels 303, and accordingly achieving even electrolyte distribution in the accommodating cavity 102. The multiple first distribution channels 302 and the multiple second distribution channels 303 may be arranged in the length direction of the lower plastic assembly 30. For example, in this embodiment, in each reflux tank 301, there may be two first distribution channels 302 and two second distribution channels 303. It is to be noted that the number of the first distribution channels 302 and the number of the second distribution channels 303 are only for illustration and do not constitute a specific limitation. The number of the first distribution channels 302 and the number of the second distribution channels 303 may be set according to the actual product design.

Referring to FIG. 3, a spacing between two adjacent first distribution channels 302 is a first spacing S1, a spacing between two adjacent second distribution channels 303 is a second spacing S2, and a spacing between the first distribution channel 302 and the second distribution channel 303 that are adjacent to each other is a third spacing S3. The first spacing S1 may be a distance between center points of two adjacent first distribution channels 302, that is, a distance between centers of two adjacent first through holes 3021. The second spacing S2 may be a distance between center points of two adjacent second distribution channels 303, that is, a distance between centers of two adjacent second through holes 3031. The third spacing S3 may be a distance between the center points of the first distribution channel 302 and the second distribution channel 303 that are adjacent to each other, that is, a distance between centers of the first through hole 3021 and the second through hole 3031 that are adjacent to each other. The third spacing S3 is equal to the first spacing S1 or the second spacing S2. In this embodiment, the first spacing S1, the second spacing S2, and the third spacing S3 are all equal to optimize fluid distribution in the first distribution channel 302 and the second distribution channel 303. In some embodiments, the first spacing S1, the second spacing S2, and the third spacing S3 may respectively range from 2 mm to 10 mm. In some embodiments, the first spacing S1, the second spacing S2, and the third spacing S3 may be respectively any of 2 mm, 3 mm, 4 mm, 5 mm, 6 mm, 7 mm, 8 mm, 8.5 mm, 9 mm, 10 mm, and the like.

The connection member 322 is connected to the first plate 3211 and the second plate 3212. The distribution body 32 includes the connection member 322 and the two distribution members 321 that are arranged in the length direction of the lower plastic assembly 30) and respectively connected to two opposite sides of the connection member 322, and the two distribution members 321 are symmetrically arranged with respect to the connection member 322. In this way, the two distribution bodies 32 respectively located at two sides of the cover plate 31 may be replaced with each other during mounting of the two distribution bodies 32, so that it is unnecessary to distinguish between mounting directions of the distribution bodies 32, thereby simplifying operations of mounting the distribution bodies 32. The connection member 322 is in the middle region of the lower plastic assembly 30, and the central axis C1 extends through the connection member 322. An end of the distribution member 321 away from the connection member 322 is located in the edge region of the lower plastic assembly 30.

The lower plastic assembly 30 further includes an engagement plate 312 connected to the cover plate 31. The engagement plate 312 is connected to a side of the cover plate 31 away from the central axis C1 in the length direction of the lower plastic assembly 30. The cover plate 31 and the engagement plate 312 are generally L-shaped. An engagement block 3215 protrudes from a side of the second plate 3212 away from the first plate 3211, where the engagement block 3215 is opposite to the plate 3211. The cover plate 31 defines an engagement slot 3111 for engagement with the engagement block 3215. After the distribution member 321 and the cover plate 31 are mounted together, the engagement block 3215 is engaged with the engagement slot 3111. In this embodiment, the connection stability between the distribution member 321 and the cover plate 31 can be enhanced by the engagement block 3215 and the engagement slot 3111.

In this embodiment, an end of the engagement block 3215 away from the second plate 3212 is a chamfered end. The chamfered end facilitates alignment of the engagement block 3215 with the engagement slot 3111 and insertion of the engagement block 3215 into the engagement slot 3111. The chamfered end may be constructed as a straight chamfered end. With the chamfered end, it is not difficult to align the engagement block 3215 with the engagement slot 3111, thereby improving a mounting speed of the distribution member 321 and the cover plate 31. For example, when the engagement block 3215 is not correctly aligned with the engagement slot 3111, the chamfered end can guide the engagement block 3215 and return the engagement block 3215 to the aligned position, so that the engagement block 3215 can be inserted into the engagement slot 3111. In some embodiments, the chamfered end may also be constructed as a circular chamfered end.

In some embodiments, a shape of a contour of the engagement block 3215 may be trapezoidal to facilitate insertion of the engagement block 3215 into the engagement slot 3111. A size of the engagement block 3215 in the length direction of the lower plastic assembly 30 decreases from an end of the engagement block 3215 close to the second plate 3212 to an end of the engagement block 3215 away from the second plate 3212. With the engagement block 3215 in the shape of a trapezoid, a fault tolerance of assembly between the engagement block 3215 and the engagement slot 3111 can be improved, and a failure in insertion of the engagement block 3215 into the engagement slot 3111 due to manufacturing errors can be avoided.

In some embodiments, an end of the second plate 3212 away from the connection member 322 is provided with an engagement plug 3216. The engagement plate 312 defines an engagement hole 3121 for engagement with the engagement plug 3216. After the distribution member 321 and the cover plate 31 are mounted together, the engagement block 3215 is engaged with the engagement slot 3111, and the engagement plug 3216 is engaged with the engagement hole 3121, so that two ends of the second plate 3212 in the length direction of the lower plastic assembly 30 are respectively engaged with the cover plate 31 and the engagement plate 312, and thus the distribution member 321 and the cover plate 31 are fully fixed, thereby improving the connection stability between the distribution member 321 and the cover plate 31.

Figure 4:
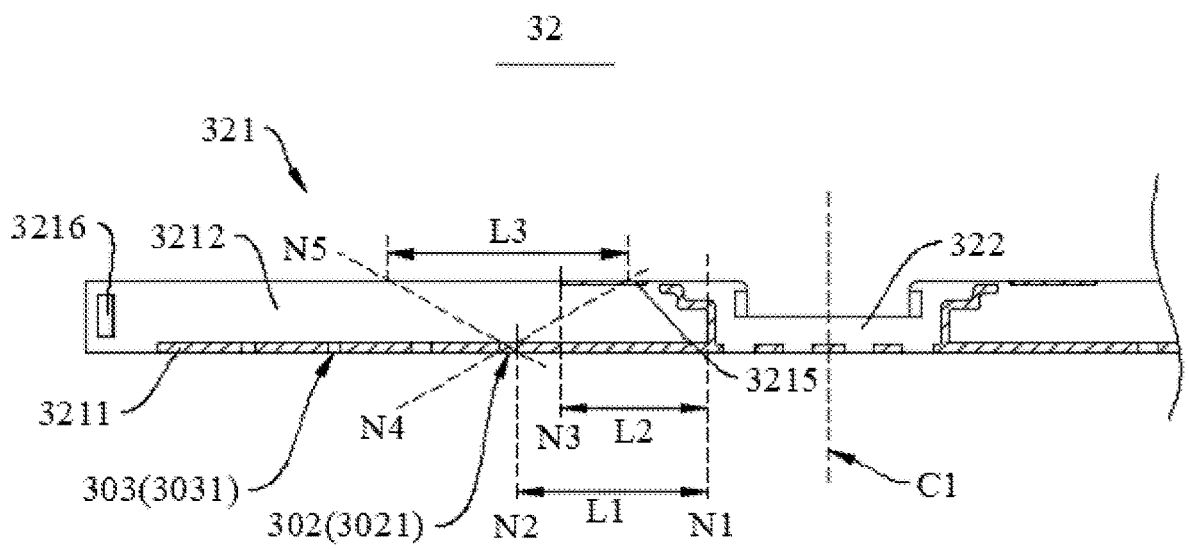
FIG. 4 is a cross-sectional view of the distribution body in FIG. 3, taken along line A-A.

Referring to FIG. 2 and FIG. 4, a distance between the connection member 322 and the first distribution channel 302 closest to the connection member 322 is a third distance L1. A distance between the connection member 322 and an end of the engagement block 3215 away from the connection member 322 is a fourth distance L2. An absolute value of a difference between the third distance L1 and the fourth distance L2 is less than or equal to a preset value. Specifically, a first dashed line N1 in FIG. 4 passes through a joint of the connection member 322 and the first plate 3211, a second dashed line N2 passes through a side of the first distribution channel 302 closest to the connection member 322, and a third dashed line N3 passes through an end of the engagement block 3215 away from the connection member 322. The first dashed line N1, the second dashed line N2, and the third dashed line N3 are respectively perpendicular to the first plate 3211. The third distance L1 is a distance between the first dashed line N1 and the second dashed line N2, and the fourth distance L2 is a distance between the first dashed line N1 and the third dashed line N3. In this embodiment, the absolute value of the difference between the third distance L1 and the fourth distance L2 is less than or equal to the preset value, so that the engagement block 3215 can be viewed, from the side of the first plate 3211 away from the cover plate 31, through the first distribution channel 302 closest to the connection member 322. For example, as shown in FIG. 4, the engagement block 3215 can be viewed, along the fourth dashed line N4, from the side of the first plate 3211 away from the cover plate 31. In this way, during mounting of the distribution member 321 and the cover plate 31, it can be observed through the first distribution channel 302 closest to the connection member 322 whether the engagement block 3215 is engaged with the engagement slot 3111. In some embodiments, upon completion of the mounting of the distribution member 321 and the cover plate 31, the mounting of the distribution member 321 and the cover plate 31 may be detected through an automatic detection device. By setting the absolute value of the difference between the third distance L1 and the fourth distance L2 to be less than or equal to the preset value, the automatic detection device may determine, through the first distribution channel 302 closest to the connection member 322, whether the engagement block 3215 and the engagement slot 3111 are assembled in position. Specifically, as shown in FIG. 4, an angled region formed between the fourth dashed line N4 and the fifth dashed line N5 at a side of the first plate 3211 close to the cover plate 31 is a recognition range of the automatic detection device. Half the distance L3 in the length direction of the lower plastic assembly 30 between two positions of the second plate 3212 that are away from the first plate 3211 and respectively corresponding to the fourth dashed line N4 and the fifth dashed line N5 is a preset value. When the absolute value of the difference between the third distance L1 and the fourth distance L2 is set to be less than or equal to the preset value, the engagement block 3215 is at least partially located between the fourth dashed line N4 and the fifth dashed line N5. In some embodiments, the preset value may be greater than 0 mm and less than or equal to 12 mm. For example, the preset value may be any of 1 mm, 2 mm, 5 mm, 7 mm, 9) mm, 11 mm, 11.7 mm, 12 mm, and the like. It is to be noted that FIG. 4 only schematically illustrates positions of the engagement block 3215 and the first distribution channel 302, and does not constitute a limitation on the positions of the engagement block 3215 and the first distribution channel 302. In some embodiments, the fourth distance L2 may be greater than the third distance L1. For example, the third distance L1 may be 13 mm, and the fourth distance L2 may be 14 mm.

Before mounting of the distribution member 321 and the cover plate 31, the automatic detection device may recognize the top cap sheet 21 through the engagement slot 3111. When the automatic detection device detects that a region of the top cap sheet 21 corresponding to the engagement slot 3111 is blocked, the automatic detection device determines that the distribution member 321 is assembled with the cover plate 31. When the engagement block 3215 is detected by the automatic detection device through the first distribution channel 302 closest to the connection member 322, the automatic detection device determines that the engagement block 3215 and the engagement slot 3111 are assembled in position.

The preset value is related to factors such as a thickness of the first plate 3211 in the height direction of the lower plastic assembly 30, a distance between two opposite ends of the first distribution channel 302 closest to the connection member 322 in the length direction of the lower plastic assembly 30, and the like. For example, a larger thickness of the first plate 3211 or a smaller distance between two opposite ends of the first distribution channel 302 closest to the connection member 322 leads to a smaller preset value.

In this embodiment, the end cap assembly 20 further includes an explosion-proof valve 23 arranged on the top cap sheet 21. When the energy-storage device 1 is damaged by external factors, for example accidental short circuit occurs due to improper charging, a temperature of the energy-storage device 1 rises sharply, and a large amount of gas is produced. When an internal pressure of the energy-storage device 1 is greater than a specific value, the explosion-proof valve 23 is blown open by the gas, so that the internal pressure of the energy-storage device 1 is reduced, thereby ensuring safety of the energy-storage device 1. Specifically, the explosion-proof valve 23 is arranged at a position of the top cap sheet 21 corresponding to the connection member 322. In this embodiment, by setting the fluid flow capacity of the first distribution channel 302 to be greater than the fluid flow capacity of the second distribution channel 303, when the energy-storage device 1 is damaged, the gas in the energy-storage device 1 can reach the explosion-proof valve 23 quickly through the first distribution channel 302, thereby increasing the corresponding speed of the explosion-proof valve 23 and improving the safety of the energy-storage device 1.

Figure 5:
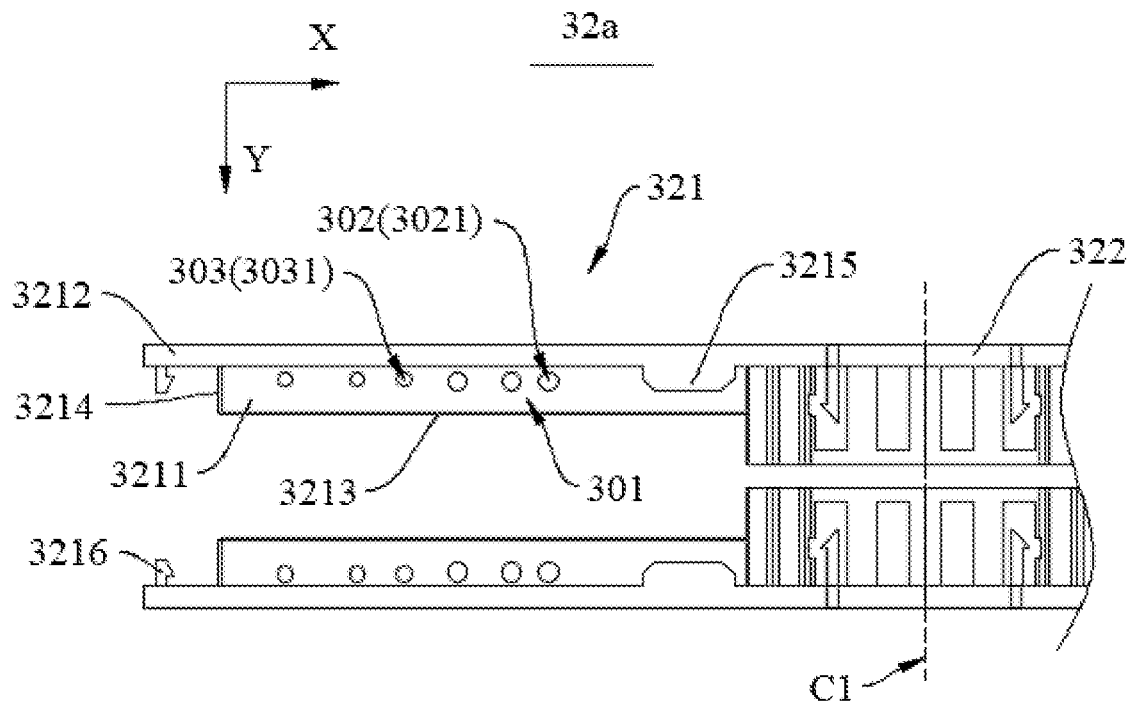
FIG. 5 is a top view of part of a distribution body according to a second embodiment of the present disclosure.

FIG. 5 is a top view of part of a distribution body 32a according to a second embodiment of the present disclosure. The distribution body 32a in the second embodiment of the present disclosure is similar to the distribution body 32 in the first embodiment in structure, but differs from the distribution body 32 in the first embodiment in that spacings among multiple first distribution channels 302 decrease from a side of the lower plastic assembly 30 away from the central axis C1 to a side of the lower plastic assembly 30 close to the central axis C1 in the length direction of the lower plastic assembly 30, and spacings among multiple second distribution channels 303 decrease from the side of the lower plastic assembly 30 away from the central axis C1 to the side of the lower plastic assembly 30 close to the central axis C1 in the length direction of the lower plastic assembly 30. In this way, the fluid flow capacity of a region of the reflux tank 301 close to the central axis C1 can be greater than the fluid flow capacity of the edge region of the reflux tank 301 in the length direction of the lower plastic assembly 30, so that more electrolyte can flow back to a region of the accommodating cavity 102 corresponding to the central axis C1, thereby achieving even electrolyte distribution in the accommodating cavity 102.

In some embodiments, some of the multiple first distribution channels 302 may be arranged at equal intervals, and spacings between the remaining first distribution channels 302 decrease from the side of the lower plastic assembly 30 away from the central axis C1 to the side of the lower plastic assembly 30 close to the central axis C1 in the length direction of the lower plastic assembly 30. In some embodiments, some of the multiple second distribution channels 303 may be arranged at equal intervals, and spacings between the remaining second distribution channels 303 decrease from the side of the lower plastic assembly 30 away from the central axis C1 to the side of the lower plastic assembly 30 close to the central axis C1 in the length direction of the lower plastic assembly 30.

Figure 6:
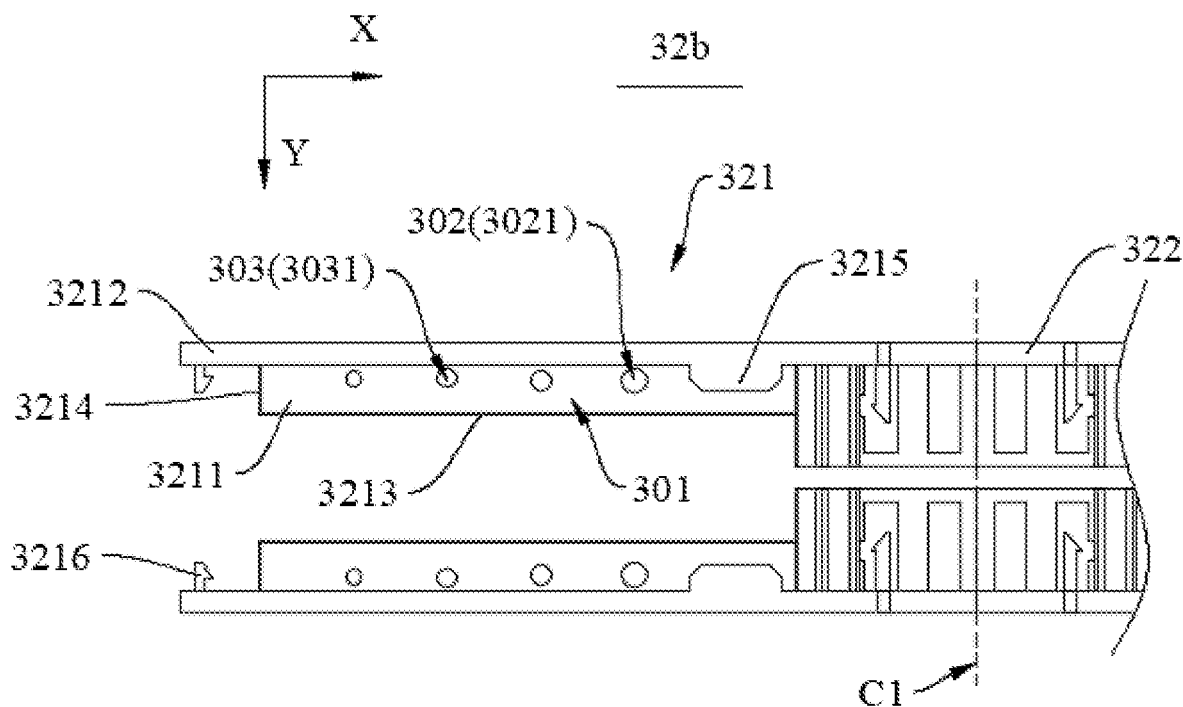
FIG. 6 is a top view of part of a distribution body according to a third embodiment of the present disclosure.

FIG. 6 is a top view of part of a distribution body 32b according to a third embodiment of the present disclosure. The distribution body 32b in the third embodiment of the present disclosure is similar to the distribution body 32 in the first embodiment in structure, but differs from the distribution body 32 in the first embodiment in that fluid flow capacities of the multiple first distribution channels 302 increase from the side of the lower plastic assembly 30 away from the central axis C1 to the side of the lower plastic assembly 30 close to the central axis C1 in the length direction of the lower plastic assembly 30, and fluid flow capacities of the multiple second distribution channels 303 increase from the side of the lower plastic assembly 30 away from the central axis C1 to the side of the lower plastic assembly 30 close to the central axis C1 in the length direction of the lower plastic assembly 30. In this way, the fluid flow capacity of the region of the reflux tank 301 close to the central axis C1 can be greater than the fluid flow capacity of the edge region of the reflux tank 301 in the length direction of the lower plastic assembly 30, so that more electrolyte can flow back to a region of the accommodating cavity 102 corresponding to the central axis C1, thereby achieving even electrolyte distribution in the accommodating cavity 102.

Figure 7:
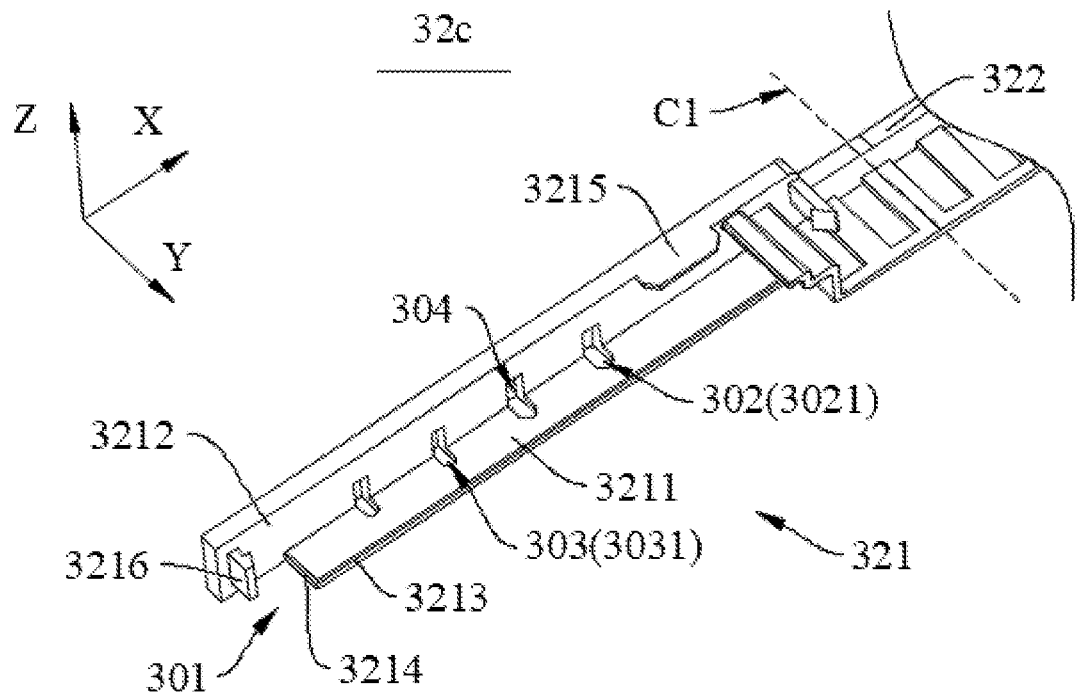
FIG. 7 is a schematic structural view of part of a distribution body according to a fourth embodiment of the present disclosure.

FIG. 7 is a schematic structural diagram of part of a distribution body 32c according to a fourth embodiment of the present disclosure. The distribution body 32c in the fourth embodiment of the present disclosure is similar to the distribution body 32 in the first embodiment in structure, but differs from the distribution body 32 in the first embodiment in that the second plate 3212 defines an auxiliary distribution channel 304 in communication with the first distribution channel 302. The auxiliary distribution channel 304 extends from a side of the second plate 3212 toward the reflux tank 301 to a side of the second plate 3212 away from the reflux tank 301. The auxiliary distribution channel 304 is configured as a reflux channel for electrolyte when the first distribution channel 302 is blocked to increase electrolyte flow capacity of the first distribution channel 302, thereby avoiding electrolyte accumulation in the reflux tank 301. In some embodiments, the number of auxiliary distribution channels 304 may be the same as the number of first distribution channels 302. Multiple auxiliary distribution channels 304 may be arranged, and the multiple auxiliary distribution channels 304 are in a one-to-one correspondence with the multiple first distribution channels 302. It may be understood that after the energy-storage device 1 is used for a period of time, an insulating film for insulation in the energy-storage device 1 may fall off. Under the influence of gravity, the electrolyte in the reflux tank 301 may flow to the accommodating cavity 102 in a direction in which the cover plate 31 faces the first plate 3211. As a result, the insulating film that falls off may block the first distribution channel 302. An opening of the auxiliary distribution channel 304 is located at a side of the second plate 3212 facing the reflux tank 301. Therefore, when the first distribution channel 302 is blocked, the electrolyte in the reflux tank 301 may further flow through the auxiliary distribution channel 304 to the accommodating cavity 102. In some embodiments, the number of the auxiliary distribution channels 304 may be less than the number of the first distribution channels 302. That is, only each of part of the first distribution channel 302 is in communication with one auxiliary distribution channel 304. In some embodiments, the auxiliary distribution channel 304 may extend through the second plate 3212 in the width direction of the lower plastic assembly 30. In some embodiments, the auxiliary distribution channel 304 may be further used as a flow channel for the gas generated by the electrolyte in the energy-storage device 1 when the energy-storage device 1 is damaged, so as to avoid that the gas cannot flow to the explosion-proof valve 23 due to blockage of the first distribution channel 302.

In some embodiments, the second plate 3212 defines an auxiliary distribution channel 304 in communication with the second distribution channel 303 to provide a reflux channel for electrolyte when the second distribution channel 303 is blocked. In some embodiments, the second plate 3212 defines an auxiliary distribution channel 304 in communication with the first distribution channel 302 and/or the second distribution channel 303, so as to provide a reflux channel for electrolyte when the first distribution channel 302 and/or the second distribution channel 303 is blocked.

Figure 8:
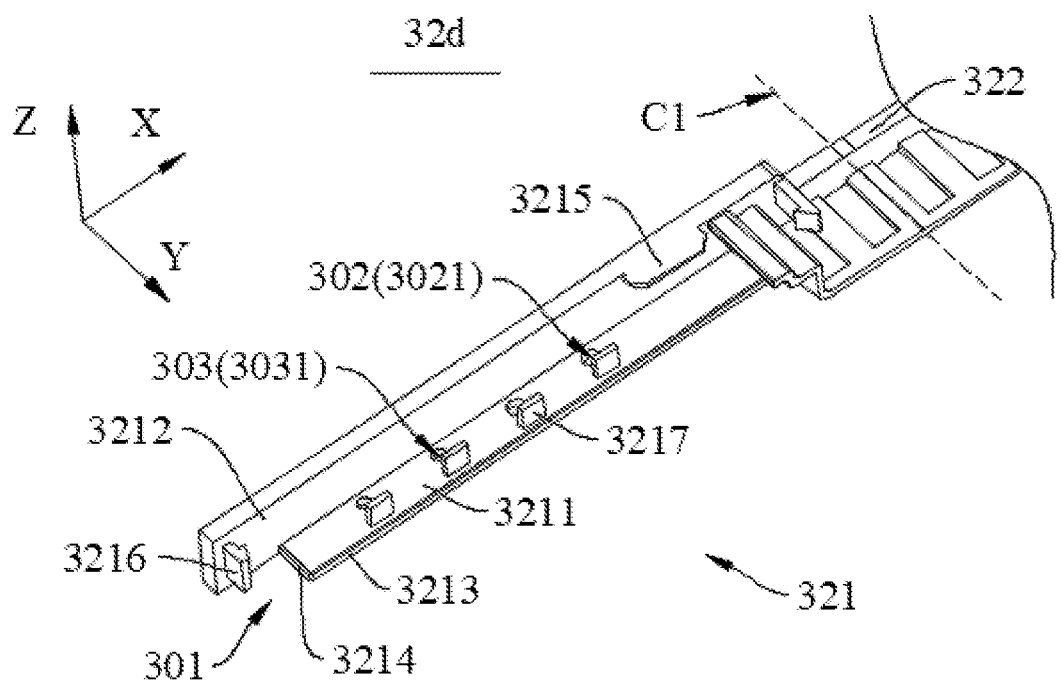
FIG. 8 is a schematic structural view of part of a distribution body according to a fifth embodiment of the present disclosure.
Figure 9:
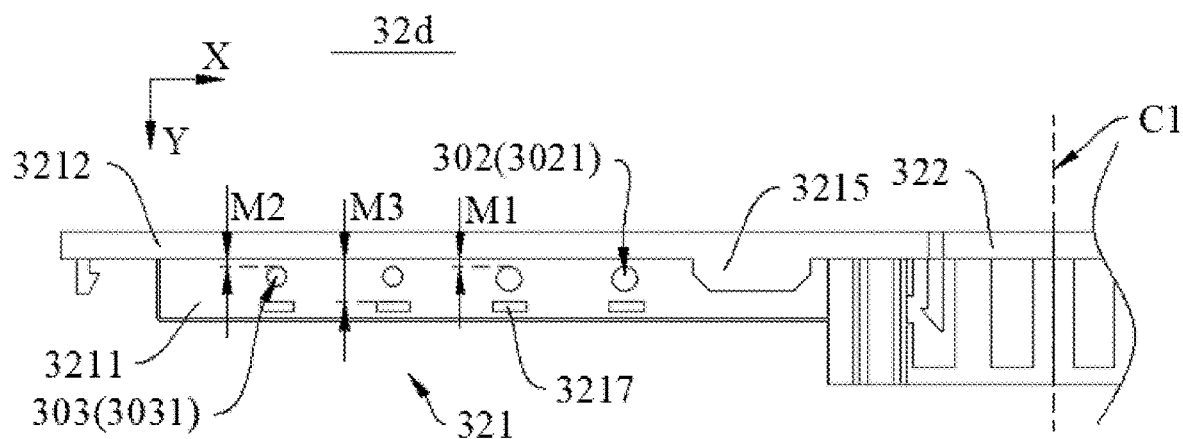
FIG. 9 is a top view of part of the distribution body according to the fifth embodiment of the present disclosure.

Referring to FIG. 8 and FIG. 9 together, FIG. 8 is a schematic structural diagram of part of a distribution body 32d according to a fifth embodiment of the present disclosure, and FIG. 9 is a top view of part of the distribution body 32d according to the fifth embodiment of the present disclosure. The distribution body 32d in the fifth embodiment of the present disclosure is similar to the distribution body 32 in the first embodiment in structure, but differs from the distribution body 32 in the first embodiment in that a block 3217 protrudes from the first plate 3211, where the block 3217 is opposite to the second plate 3212. The block 3217 extends from the first plate 3211 toward the cover plate 31. An extending height of the block 3217 may be specifically set by a person skilled in the art according to actual needs, which is not specifically limited in the present disclosure. The block 3217 is configured to prevent the first distribution channel 302 or the second distribution channel 303 from being blocked by components in the reflux tank 301, for example, prevent the first distribution channel 302 or the second distribution channel 303 from being blocked by the tab 112 in the reflux tank 301. In some embodiments, when the insulating film that falls off in the energy-storage device 1 moves to the vicinity of the first distribution channel 302 or the vicinity of the second distribution channel 303 of the first plate 3211, the insulating film may be stopped by the block 3217 due to that the block 3217, the first plate 3211, and the second plate 3212 cooperatively form a support space, thereby preventing an opening of the first distribution channel 302 facing the cover plate 31 or an opening of the second distribution channel 303 facing the cover plate 31 from being blocked by the insulating film.

A shape of the block 3217 may be a cylinder, a prism, a frustum of a cone, and the like, which is not specifically limited in the present disclosure. For example, the block 3217 may be cuboid. For example, an end of the block 3217 away from the first plate 3211 is in the shape of a filleted corner, thereby preventing the block 3217 from scratching or cutting the tab 112 when contacting the tab 112.

In some embodiments, a distance between the first distribution channel 302 and the second plate 3212 is a fifth distance M1. A distance between the second distribution channel 303 and the second plate 3212 is a sixth distance M2. A distance between the block 3217 and the second plate 3212 is a seventh distance M3. The fifth distance M1 and the sixth distance M2 are both less than the seventh distance M3, so as to prevent the block 3217 from blocking flow of electrolyte to both the first distribution channel 302 and the second distribution channel 303. Specifically, an electrolyte flow channel is formed between the block 3217 and the second plate 3212, and electrolyte can flow to both the first distribution channel 302 and the second distribution channel 303 through the flow channel, so that with the first distribution channel 302 and the second distribution channel 303, electrolyte distribution can be well performed. In some embodiments, the sixth distance M2 is less than the seventh distance M3, and the fifth distance M1 may be greater than or equal to the seventh distance M3, so that more electrolyte can flow to the first distribution channel 302. In some embodiments, the fifth distance M1 is less than the seventh distance M3, so that the fluid flow capacity of the first distribution channel 302 and the fluid flow capacity of the second distribution channel 303 can be further adjusted.

In some embodiments, multiple blocks 3217 are arranged. The number of the blocks 3217 equals a sum of the number of the first distribution channels 302 and the number of the second distribution channels 303 to protect each first distribution channel 302 and each second distribution channel 303. For example, the number of the blocks 3217 may be four. It may be set that the four blocks 3217 are spaced apart from the second plate 3212 by a same distance, so that a fluid flow channel is formed between the blocks 3217 and the second plate 3212, and the electrolyte in the reflux tank 301 can flow to the first distribution channel 302 or the second distribution channel 303 smoothly.

Figure 10:
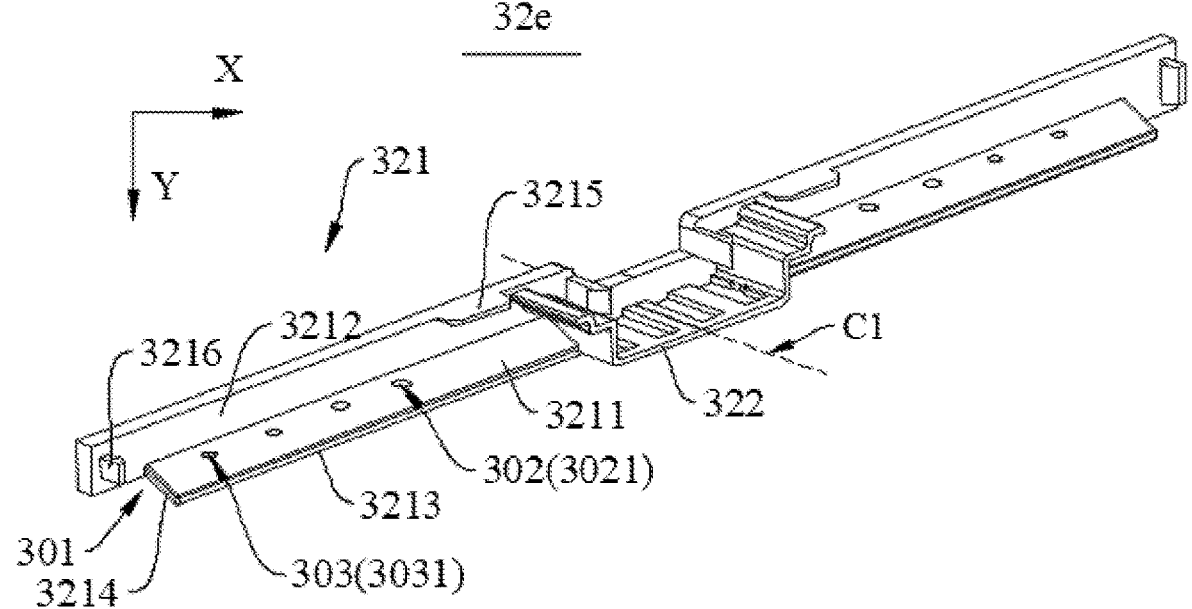
FIG. 10 is a schematic structural view of a distribution body in a lower plastic assembly according to a sixth embodiment of the present disclosure.

FIG. 10 is a schematic structural diagram of part of a distribution body 32e in a lower plastic assembly 30 according to a sixth embodiment of the present disclosure. The distribution body 32e in the sixth embodiment of the present disclosure is similar to the distribution body 32 in the first embodiment in structure, but differs from the distribution body 32 in the first embodiment in that the first plate 3211 is inclined relative to the second plate 3212 in a direction in which the first plate 3211 faces away from the cover plate 31. Specifically, the first plate 3211 is connected to an end of the second plate 3212 away from the cover plate 31. The first plate 3211 and the second plate 3212 are arranged at an obtuse angle, that is, a distance between an end of the first plate 3211 close to the second plate 3212 and the cover plate 31 is less than a distance between an end of the first plate 3211 away from the second plate 3212 and the cover plate 31. In this way, the electrolyte flowing out from the accommodating cavity 102 can be prevented from retention on a surface of the first plate 3211 close to the cover plate 31 and at the joint of the first plate 3211 and the second plate 3212, thereby avoiding a waste of electrolyte.

Figure 11:
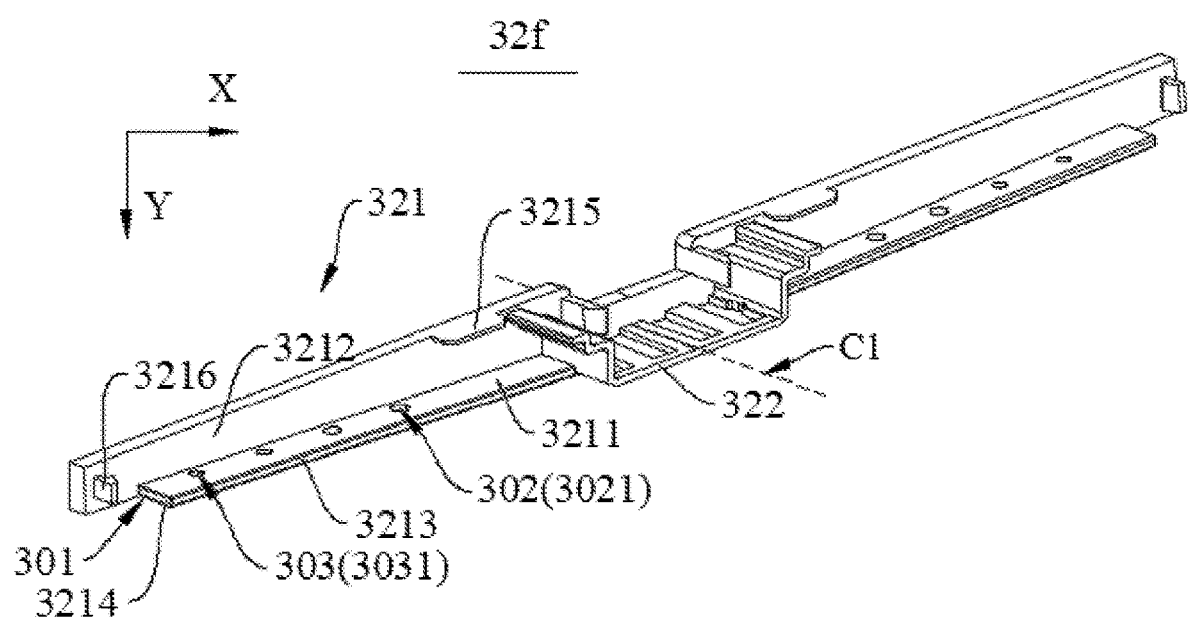
FIG. 11 is a schematic structural view of a distribution body in a lower plastic assembly according to a seventh embodiment of the present disclosure.

FIG. 11 is a schematic structural diagram of part of a distribution body 32f in a lower plastic assembly 30 according to a seventh embodiment of the present disclosure. The distribution body 32f in the seventh embodiment of the present disclosure is similar to the distribution body 32 in the first embodiment in structure, but differs from the distribution body 32 in the first embodiment in that a distance between the first plate 3211 and the cover plate 31 increases from the edge portion of the lower plastic assembly 30 to a position of the lower plastic assembly 30 close to the central axis C1 in the length direction of the lower plastic assembly 30. The second plate 3212 is configured as a right-angled trapezoidal plate. An end of the second plate 3212 for forming a right angle is connected to the cover plate 31, and an inclined end of the second plate 3212 is connected to the first plate 3211. In this way, the electrolyte flowing out from the accommodating cavity 102 can flow back, in an inclined direction of the first plate 3211, to a region of the accommodating cavity 102 near the central axis C1 in the length direction of the lower plastic assembly 30, to supply electrolyte to the region of the accommodating cavity 102 near the central axis.

An embodiment of the present disclosure further provides an electricity-consumption device. The electricity-consumption device includes any one of the energy-storage devices 1. The energy-storage device 1 is configured to provide electric energy for the electricity-consumption device. The electricity-consumption device may be, but is not limited to, portable devices such as a Bluetooth headset, a mobile phone, and a tablet computer, and large-scale devices such as an electric motorcycle, a fuel automobile, a new energy electric automobile, and an energy storage power station, which are not limited in the embodiment of the present disclosure. The electricity-consumption device is an automobile by way of example for illustration. The automobile may be a fuel automobile, a gas automobile, or a new energy automobile, and the new energy automobile may be a pure electric automobile, a hybrid automobile, an extended-range automobile, or the like. The automobile includes the energy-storage device 1, a controller, and a motor. The energy-storage device 1 is configured to supply power to the controller and the motor, so that the controller can serve as an operating power supply of the automobile and the motor can serve as a driving power supply of the automobile. For example, the energy-storage device 1 is configured to provide working power when the automobile is started, navigated, and operated. For example, the energy-storage device 1 can supply power to the controller, and the controller can control the energy-storage device 1 to supply power to the motor. The motor can receive and use the power of the energy-storage device 1 to serve as the driving power supply of the automobile, replacing or partially replacing fuel or natural gas to provide driving power for the automobile.

It may be understood that the electricity-consumption device may further be a battery module, a battery pack, a battery system, or the like. The battery module may be formed by multiple energy-storage devices 1 connected in series and/or in parallel, and the battery pack may include one or more battery modules.

The foregoing descriptions are merely specific implementations of the present disclosure, but are not intended to limit the protection scope of the present disclosure. Various equivalent modifications or substitutions can be readily figured out by any person skilled in the art, and these modifications or substitutions shall fall within the protection scope of the present disclosure. Therefore, the protection scope of the present disclosure shall be subject to the protection scope of the claims.

What is claimed is:

1. An energy-storage device, comprising:
   a housing having an opening, wherein the housing is provided with an accommodating cavity in communication with the opening, and the accommodating cavity is configured to store fluid;
   an electrode assembly, wherein the electrode assembly is accommodated in the accommodating cavity, and the electrode assembly is configured as a wound electrode assembly;
   an end cap assembly, wherein the end cap assembly covers the opening; and
   a lower plastic assembly comprising a cover plate and two distribution members, wherein the cover plate is mounted to the end cap assembly, the two distribution members are arranged in a width direction of the lower plastic assembly and connected to the cover plate, and each of the distribution members is provided with a reflux tank in communication with the accommodating cavity, wherein
   each reflux tank is configured to collect fluid flowing out from the accommodating cavity and distribute the fluid into the accommodating cavity to immerse the electrode assembly; and
   each reflux tank defines a first distribution channel and a second distribution channel in a length direction of the lower plastic assembly, wherein the first distribution channel is located between the second distribution channel and a central axis of the lower plastic assembly, fluid flow capacity of the first distribution channel is greater than fluid flow capacity of the second distribution channel, and in the length direction of the lower plastic assembly, the first distribution channel corresponds to a middle portion of the electrode assembly, and the second distribution channel corresponds to a side portion of the electrode assembly,
   wherein a ratio of the fluid flow capacity of the first distribution channel to the fluid flow capacity of the second distribution channel is greater than 1 and less than or equal to 4.

2. The energy-storage device according to claim 1, wherein the two distribution members are symmetrically arranged with respect to the cover plate in the width direction of the lower plastic assembly.

3. The energy-storage device according to claim 1, wherein the first distribution channel is implemented as a plurality of first distribution channels, and the plurality of first distribution channels are arranged at equal intervals; the second distribution channel is implemented as a plurality of second distribution channels, and the plurality of second distribution channels are arranged at equal intervals.

4. The energy-storage device according to claim 3, wherein a spacing between each two adjacent first distribution channels is a first spacing, a spacing between each two adjacent second distribution channels is a second spacing, a spacing between the first distribution channel and the second distribution channel that are adjacent to each other is a third spacing, and the third spacing is equal to the first spacing or the second spacing.

5. The energy-storage device according to claim 1, wherein the first distribution channel is implemented as a plurality of first distribution channels, and the second distribution channel is implemented as a plurality of second distribution channels, wherein
   spacings among the plurality of first distribution channels decrease from a side of the lower plastic assembly away from the central axis to a side of the lower plastic assembly close to the central axis in the length direction of the lower plastic assembly, and spacings among the plurality of second distribution channels decrease from the side of the lower plastic assembly away from the central axis to the side of the lower plastic assembly close to the central axis in the length direction of the lower plastic assembly; or
   fluid flow capacities of the plurality of first distribution channels increase from the side of the lower plastic assembly away from the central axis to the side of the lower plastic assembly close to the central axis in the length direction of the lower plastic assembly, and fluid flow capacities of the plurality of second distribution channels increase from the side of the lower plastic assembly away from the central axis to the side of the lower plastic assembly close to the central axis in the length direction of the lower plastic assembly.

6. The energy-storage device according to claim 1, wherein the first distribution channel is configured as a first through hole, the second distribution channel is configured as a second through hole, and a ratio of a cross-sectional area of the first through hole to a cross-sectional area of the second through hole ranges from 1.12 to 3.24.

7. The energy-storage device according to claim 1, wherein each distribution member comprises a first plate and a second plate connected to the first plate, the first plate is arranged opposite to the cover plate, the second plate is located between the cover plate and the first plate, and the first plate defines the first distribution channel and the second distribution channel.

8. The energy-storage device according to claim 7, wherein the first distribution channel and the second distribution channel are arranged close to the second plate, a distance between the first distribution channel and the second plate is a first distance, a distance between the second distribution channel and the second plate is a second distance, and at least one of the first distance or the second distance ranges from 0.5 mm to 3 mm.

9. The energy-storage device according to claim 7, wherein an engagement block protrudes from a side of the second plate away from the first plate, the engagement block is opposite to the first plate, and the cover plate defines an engagement slot configured to be engaged with the engagement block.

10. The energy-storage device according to claim 9, wherein the lower plastic assembly further comprises a connection member connected to both the first plate and the second plate, the central axis extends through the connection member, a distance between the connection member and the first distribution channel closest to the connection member is a third distance, a distance between the connection member and an end of the engagement block away from the connection member is a fourth distance, and an absolute value of a difference between the third distance and the fourth distance is less than or equal to a preset value.

11. The energy-storage device according to claim 7, wherein the first plate comprises a first edge portion and a second edge portion, one end of the second edge portion is connected to the second plate, another end of the second edge portion is connected to the first edge portion, and at least one of the first edge portion or the second edge portion is in a shape of a filleted corner.

12. The energy-storage device according to claim 7, wherein the second plate defines an auxiliary distribution channel in communication with at least one of the first distribution channel or the second distribution channel.

13. The energy-storage device according to claim 7, wherein a block protrudes from the first plate, and the block is opposite to the second plate.

14. The energy-storage device according to claim 13, wherein a distance between the first distribution channel and the second plate is a fifth distance, a distance between the second distribution channel and the second plate is a sixth distance, a distance between the block and the second plate is a seventh distance, and at least one of the fifth distance or the sixth distance is less than the seventh distance.

15. An electricity-consumption device, comprising:
an energy-storage device configured to provide electric energy for the electricity-consumption device and comprising:
a housing having an opening, wherein the housing is provided with an accommodating cavity in communication with the opening, and the accommodating cavity is configured to store fluid;
an electrode assembly, wherein the electrode assembly is accommodated in the accommodating cavity, and the electrode assembly is configured as a wound electrode assembly;
an end cap assembly, wherein the end cap assembly covers the opening; and
a lower plastic assembly comprising a cover plate and two distribution members, wherein the cover plate is mounted to the end cap assembly, the two distribution members are arranged in a width direction of the lower plastic assembly and connected to the cover plate, and each of the distribution members is provided with a reflux tank in communication with the accommodating cavity, wherein
each reflux tank is configured to collect fluid flowing out from the accommodating cavity and distribute the fluid into the accommodating cavity to immerse the electrode assembly; and
each reflux tank defines a first distribution channel and a second distribution channel in a length direction of the lower plastic assembly, wherein the first distribution channel is located between the second distribution channel and a central axis of the lower plastic assembly, fluid flow capacity of the first distribution channel is greater than fluid flow capacity of the second distribution channel, and in the length direction of the lower plastic assembly, the first distribution channel corresponds to a middle portion of the electrode assembly, and the second distribution channel corresponds to a side portion of the electrode assembly, wherein a ratio of the fluid flow capacity of the first distribution channel to the fluid flow capacity of the second distribution channel is greater than 1 and less than or equal to 4.

16. The electricity-consumption device according to claim 15, wherein the two distribution members are symmetrically arranged with respect to the cover plate in the width direction of the lower plastic assembly.

17. The electricity-consumption device according to claim 15, wherein the first distribution channel is implemented as a plurality of first distribution channels, and the plurality of first distribution channels are arranged at equal intervals; the second distribution channel is implemented as a plurality of second distribution channels, and the plurality of second distribution channels are arranged at equal intervals.

18. The electricity-consumption device according to claim 17, wherein a spacing between each two adjacent first distribution channels is a first spacing, a spacing between each two adjacent second distribution channels is a second spacing, a spacing between the first distribution channel and the second distribution channel that are adjacent to each other is a third spacing, and the third spacing is equal to the first spacing or the second spacing.

19. The electricity-consumption device according to claim 15, wherein the first distribution channel is implemented as a plurality of first distribution channels, and the second distribution channel is implemented as a plurality of second distribution channels, wherein
spacings among the plurality of first distribution channels decrease from a side of the lower plastic assembly away from the central axis to a side of the lower plastic assembly close to the central axis in the length direction of the lower plastic assembly, and spacings among the plurality of second distribution channels decrease from the side of the lower plastic assembly away from the central axis to the side of the lower plastic assembly close to the central axis in the length direction of the lower plastic assembly; or fluid flow capacities of the plurality of first distribution channels increase from the side of the lower plastic assembly away from the central axis to the side of the lower plastic assembly close to the central axis in the length direction of the lower plastic assembly, and fluid flow capacities of the plurality of second distribution channels increase from the side of the lower plastic assembly away from the central axis to the side of the lower plastic assembly close to the central axis in the length direction of the lower plastic assembly.

* * * * *